(No Model.)
G. A. SCHEEFFER.
ELECTRIC METER.
No. 522,674.  Patented July 10, 1894.
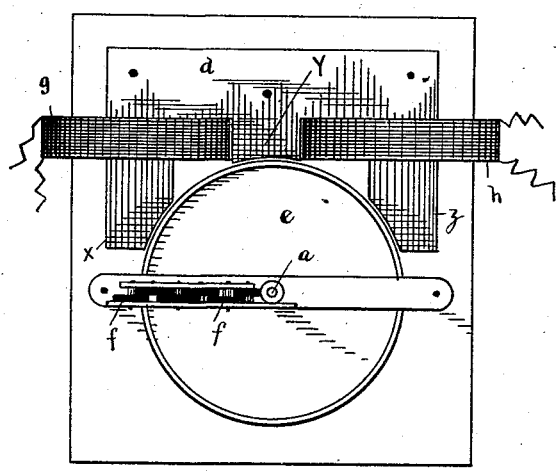
Fig. 1.
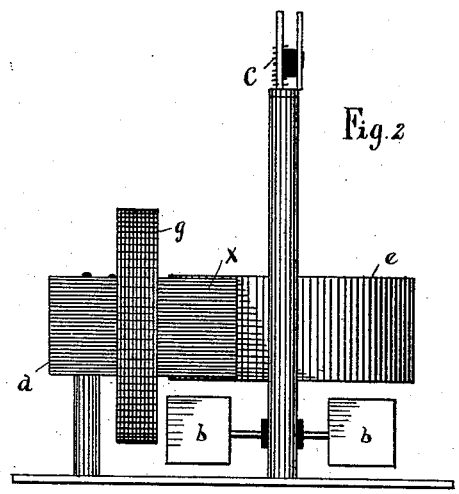
Fig. 2.
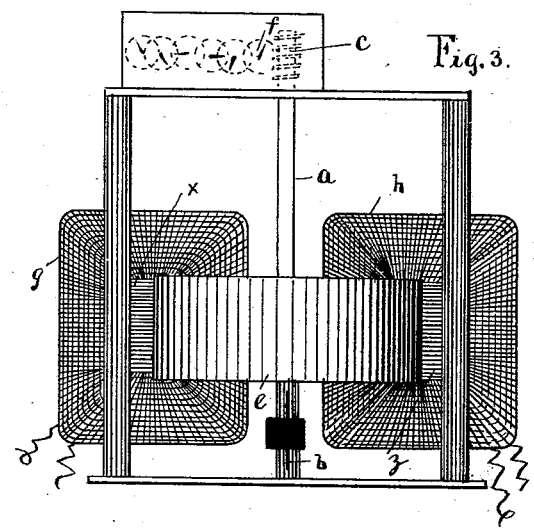
Fig. 3.
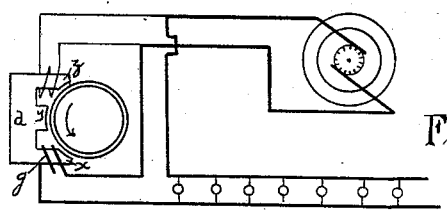
Fig. 4.
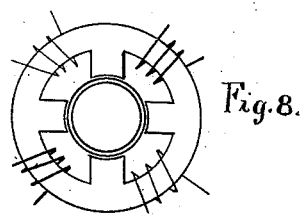
Fig. 8.
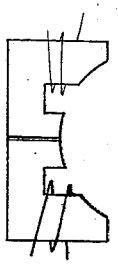
Fig. 5.
Fig. 6.
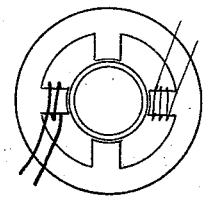
Fig. 7.
Witnesses.
A. Keithley
L. M. Thurlow
Inventor
Gustave A. Scheeffer
By W. V. Tefft
Atty.

UNITED STATES PATENT OFFICE.

GUSTAVE A. SCHEEFFER, OF PEORIA, ILLINOIS.

ELECTRIC METER.

SPECIFICATION forming part of Letters Patent No. 522,674, dated June 10, 1894.

Application filed April 2, 1894. Serial No. 506,016. (No model.)

*To all whom it may concern:*

Be it known that I, GUSTAVE A. SCHEEFFER, a citizen of the United States, residing at Peoria, in the county of Peoria and State of Illinois, have invented certain new and useful Improvements in Electric Meters; and I do hereby declare that the following is a full, clear, and exact description of the invention, which will enable others skilled in the art to which it appertains to make and use the same.

My invention relates to meters for measuring electric energy.

It relates more especially to the class of electric current meters, in which an unwound magnetic armature is employed, and is magnetized by coils so as to produce diametrically opposite poles, and in which the armature so magnetized is contained in a magnetic field induced by other coils from which arrangement movement results. In such meters various kinds of armatures have been used, but I obtain the best results by using a cylinder of copper or other metal mounted upon the spindle of the meter, and revolving in inductive proximity to the poles of a multipolar magnet or multi-polar magnets, which are arranged externally to it with their poles facing it, their arrangement being such that each portion of the surface of the cylinder encounters the poles of each magnet successively. By the employment of a cylinder, all portions thereof travel through the magnetic field of force at a uniform speed.

My invention consists essentially in the particular construction of the multi polar magnet, in which are employed three polar projections or magnetic surfaces, the two outside legs being wound one with a coil in series with the load to be measured, and the other with a fine wire coil, in shunt with the load, and the other limb or magnetic surface of the magnet without any coil, the said polar projections or magnetic surfaces being so formed as to provide for the turning of a metallic cylinder in inductive proximity to the said polar projections or magnetic surfaces, and I have set out in the drawings the general principles of operation. By arranging only the polar ends of the magnets to act upon the cylinder, the fields of force, through which the cylinder turns, are of varying density caused by the constant shifting of the currents, which causes the cylinder to revolve. The revolving cylinder is preferably made hollow or open inside the circumferential band as it best adapts it for the purpose on account of the light bearing upon its support, but it may be made solid or in any suitable form desired to adapt it to any particular uses. The meter embodying these improvements has been found, by practical use, to give a registry which varies in so nearly exact ratio with the variations of current, that the margin of error is reduced to so low a percentage as to be unappreciable for practical use. I use a fan as a retarder in connection with the meter mounted upon the spindle, which carries the cylindrical armature, which serves to produce the necessary retardation; also I magnetize the armature or metallic cylinder by means of a coil of comparatively few turns.

In order that my invention may be more fully understood and readily carried into effect, I will proceed to describe the drawings hereunto annexed.

In the drawings Figure 1 is a plan view of a meter constructed in accordance with my invention. Fig. 2 is a side elevation of the same. Fig. 3 is a vertical section. Fig. 4 is a plan view in connection with which the circuit is shown. Fig. 5 is a detailed view of the magnet. Fig. 6 shows a modification of the magnet. Fig. 7 is also a modification showing a circular multi-polar magnet with armature mounted to revolve in the central portion thereof. Fig. 8 is also a modification showing the same as Fig. 7 but with different windings.

In the figures $a$ is a spindle, which may be provided with a suitable pivot at its lower end, and also proper bearing at the top. Upon the spindle are the fans $b$, which may be suitably connected with the collar thereon.

$e$ is the armature or metallic cylinder also mounted on the spindle $a$.

$c$ is a worm gear on the spindle $a$, giving motion to the train of counting wheels $f$. This is an ordinary meter train.

$d$ is a multi-polar magnet upon one pole of which is wound the coil $g$ in which the current to be measured flows. It has an alternating current derived usually from a dynamo. $h$ is another coil, in which also an alternating current is passed. This second current is usually derived from a shunt across the leads, and so the second current remains approximately uniform whatever may be the fluctuations of the main current passed in the coil $g$. This arrangement of the coils forms, however, no part of my invention. Such circuit connections are shown in Fig. 4. The two coils produce, in the armature, polarization on intersecting lines and the metallic cylinder or armature is caused to rotate. The armature is made in a cylindrical form and of copper or other metal, and is mounted upon the spindle $a$, of the meter and revolves in inductive proximity to the poles $x$, $y$, $z$, of the multi-polar magnet, which are arranged externally to it, at right angles with their poles, facing it, their arrangement being such that each portion of the surface of the cylinder encounters the poles of each magnet successively. The multi-polar magnet $d$ is built up of laminated pieces of iron, and the peculiar form of the magnet, by which the intermediate pole or magnetic surface, that approaches in close proximity to the revolving armature, is provided constitutes the essence of my invention.

This meter is useful for measuring alternating currents. The multi-polar laminated magnet $d$ has upon pole $x$ the coil $g$, which is in series with the load to be measured. Upon pole $h$ there is wound a fine wire coil in shunt with the load, and the intermediate limb $y$ of the magnet is without any coil. This is the particular and preferred construction of magnet designed to be used in connection with this meter, but other forms may be employed, as for instance that shown in Fig. 6, in which two independent magnets are used, one having a series coil, and the other a shunt coil, and when the unwound poles of the two magnets are in close proximity the effect will be in a measure the same as that derived from the use of the magnet above described as the one preferably used, and as the said unwound poles are moved closer together the effect upon the cylindrical armature, approaches, in proportion to their nearness to each other, the perfection attained by the use of the preferred form herein previously described. A multi-polar magnet in the form shown in Figs. 7 and 8 may also be employed for the purpose, the difference in effect in the use of the two different forms resulting from the difference in winding.

The cylindrical armature will revolve in the direction indicated by the arrow in Fig. 4 of the drawings, when the coils on the poles $x$ and $z$ are wound the same way, and with the series coil on pole $x$ and the shunt coil on pole $z$, when the proper connection is made with the circuit, but the direction of turning of the cylindrical armature may be changed so as to run in the opposite direction by merely reversing the coils, that is by simply changing them, the series coil to pole $z$ and the shunt coil to pole $x$.

I do not wish to confine myself so closely to the form and arrangement of the various elements of the meter shown in the drawings as to exclude my right to such equivalence in construction and arrangement as would amount to mere colorable alterations in the principles herein shown; but I desire to include within the scope of my invention all such said colorable alterations as amount to equivalents.

Having thus fully described my invention, what I claim, and desire to secure by Letters Patent, is—

1. In an electric meter, the combination with a metallic cylinder free to rotate, of the multi-polar magnet $d$ provided with the centrally disposed leg $y$ or polar surface that approaches in close proximity to the revolving face of the cylinder, the said multi-polar magnet being built up of laminated iron or magnetic metal.

2. In an electric meter, the combination of a stationary multi-polar magnet, provided with three polar or magnetic surfaces and a metallic cylindrical rotating armature magnetized thereby.

3. In an electric meter, the combination with a metallic cylinder or armature, of the multi-polar magnet $d$ provided with the intermediate or central leg $y$, approaching in close proximity to the surface of the revolving cylinder or armature.

4. In an electric meter, the combination of a rotating cylindrical armature, the stationary multi-polar magnet $d$ provided with the central leg $y$ thereof approaching in close proximity to the surface of the revolving disk armature, and the retarding face $b$.

5. In an electric meter, a multi-polar magnet formed of laminated iron and provided with three polar projections or magnetic surfaces, the two outside poles wound, one with a coil in series with the load, and the other with a fine wire in shunt with the load, the third pole or magnetic surface located between the said outside poles and without any coil, in combination with a metallic cylinder adjusted at right angles with the said poles or polar surfaces and free to rotate.

In testimony whereof I affix my signature in presence of two witnesses.

GUSTAVE A. SCHEEFFER.

Witnesses:
 WILLIAM E. FRANCIS,
 W. V. TEFFT.